Oct. 14, 1958    J. D. WEBER ET AL    2,855,663
CONVERTIBLE TOP JIG
Filed July 9, 1956    2 Sheets-Sheet 2

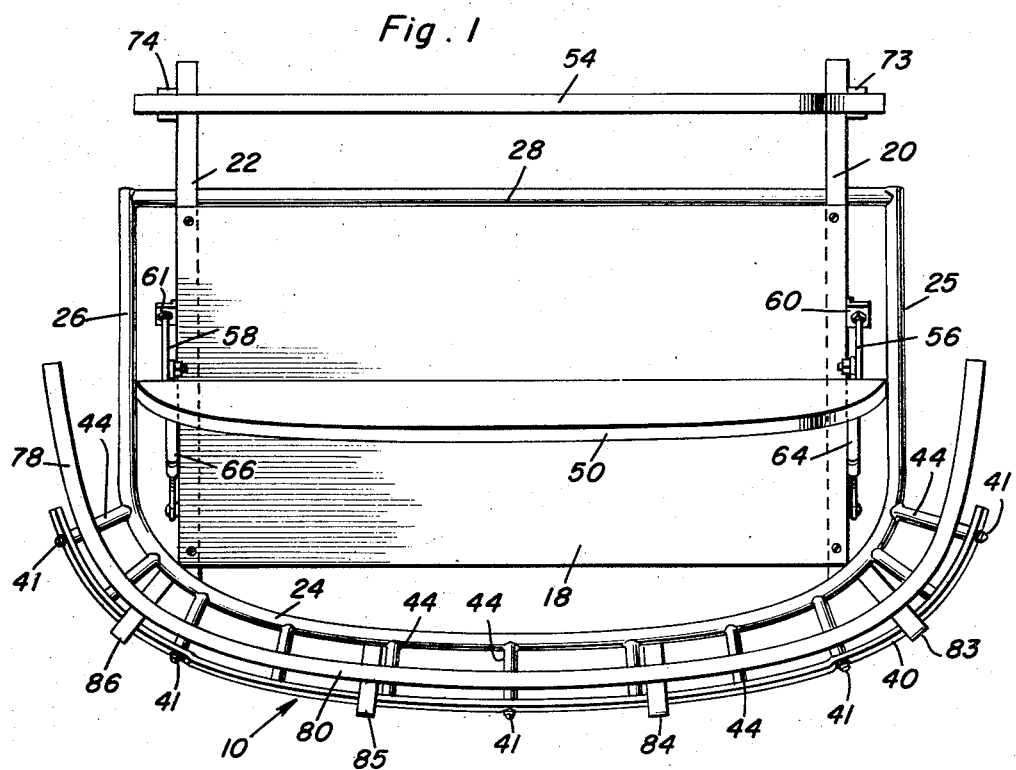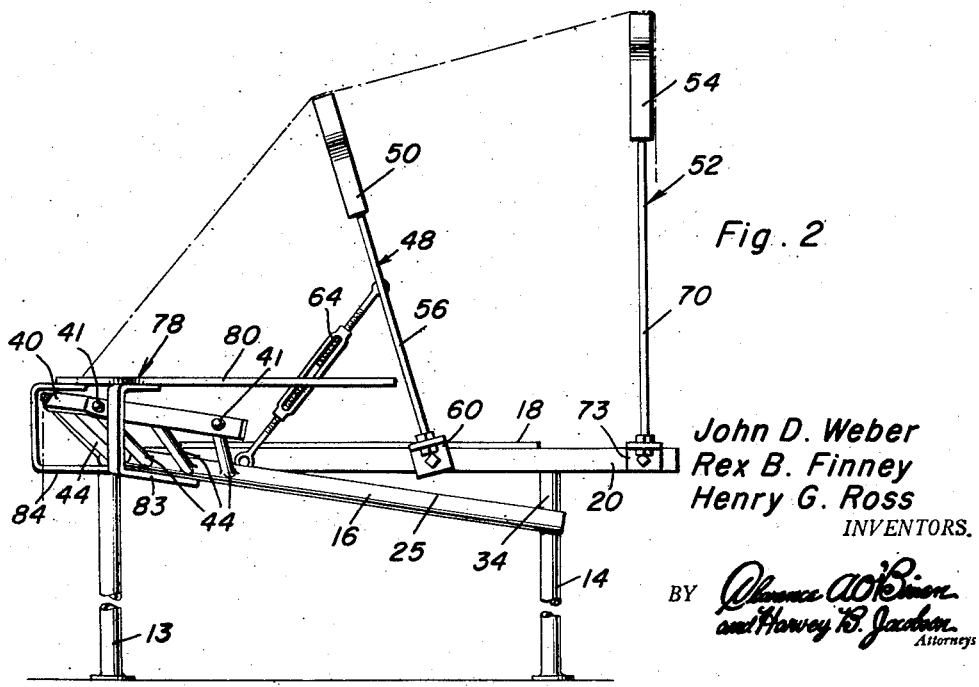

John D. Weber
Rex B. Finney
Henry G. Ross
INVENTORS.

BY
Attorneys

2,855,663

CONVERTIBLE TOP JIG

John D. Weber, Rex B. Finney, and Henry G. Ross, Urbana, Ill.

Application July 9, 1956, Serial No. 596,478

3 Claims. (Cl. 29—286)

This invention relates to jigs and more particularly to a convertible top jig to facilitate correct installation of convertible tops on modern motor vehicles.

Automotive vehicles with collapsible, flexible tops, commonly referred to as convertibles, require periodic removal and replacement of the flexible top. One of the more difficult steps in installing a replacement convertible top is attaching the rear edge or part of the replacement top in such a way that the top is wrinkle free. Accordingly, an object of the present invention is to provide a jig which will facilitate this operation and which will make it easier to and require less skill to attach the rear part of the replacement top in place on the convertible automobile.

At one time the rear part of the convertible top was simply tacked in place to a stationarily mounted tacking strip along an edge of the body of the motor vehicle. These strips deteriorated too rapidly and it has become a practice of present automobile manufacturers to provide a detachable tacking strip, the strip usually being bolted in place. It is now the practice and custom to remove this strip and secure it, as by tacking, onto the replacement convertible top and then install the replacement top together with the strip as a unit in the automobile. Accordingly, a more specific object of the invention is to provide a jig to support the tacking strip after it has been removed from the motor vehicle and support the convertible top in such a manner that it may be tacked directly to the strip.

It is a further object of the present invention to provide a jig in which the tacking strip from the motor vehicle is supported in the same shape as it appears in the motor vehicle, together with simulated rear and intermediate bows adjacent to the tacking strip support on which the convertible top replacement is adapted to be held while the part of the replacement top near the tacking strip is retained behind a preformer whereby the tacking strip is attached to the convertible top replacement in an orderly, neat and precise fashion which results in the installation of a convertible top which is both straight, accurate and wrinkle free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top view of a jig which is constructed in accordance with the invention;

Figure 2 is a side view of the jig in Figure 1;

Figure 3:
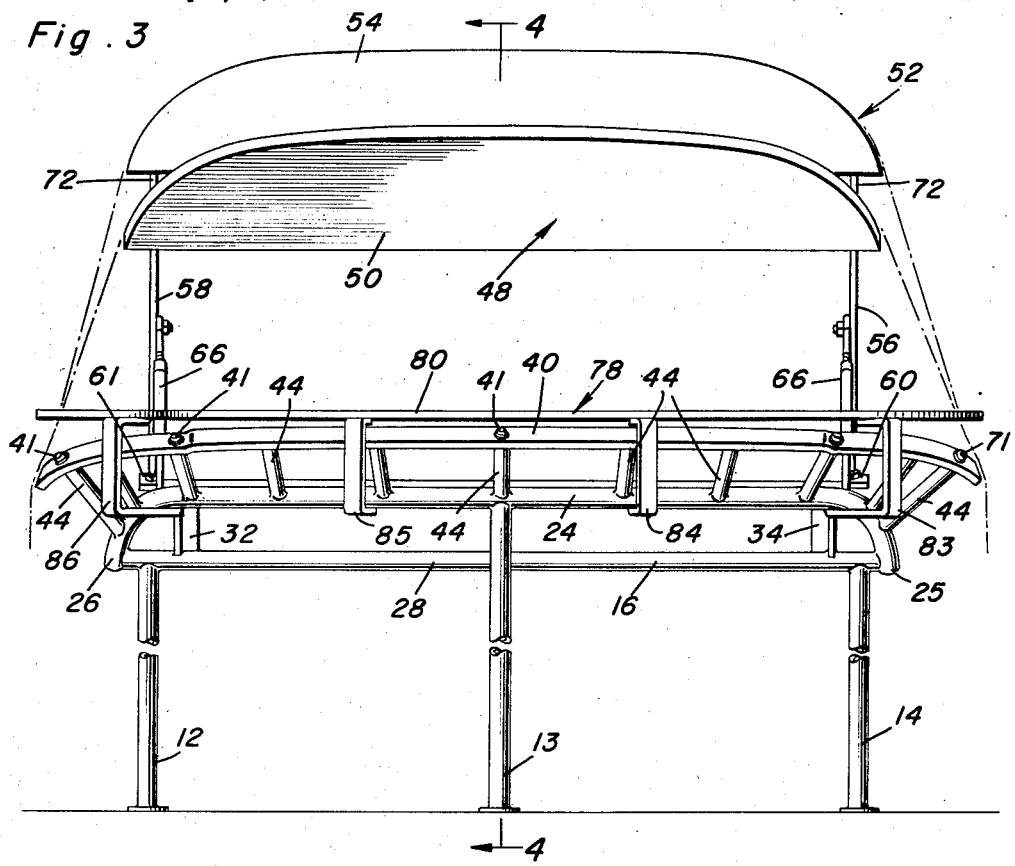
Figure 3 is a front view of the jig of Figure 1.
Figure 4:
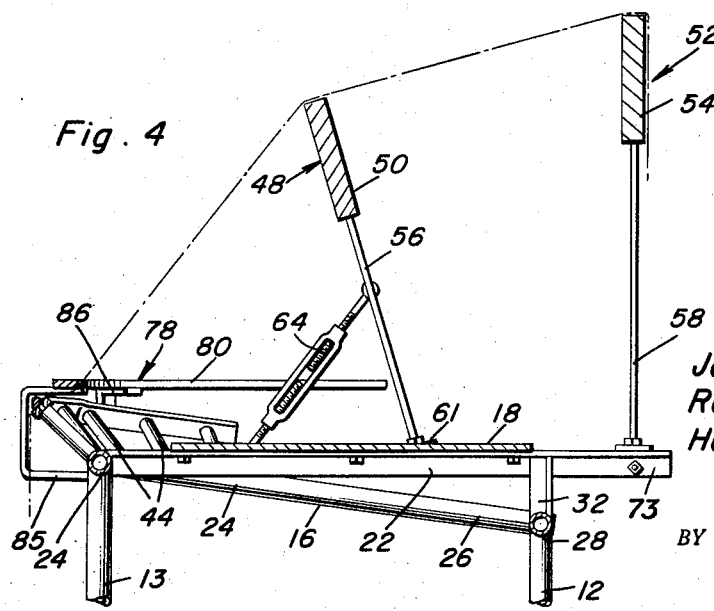
Figure 4 is a longitudinal sectional view taken approximately on the line 4—4 of Figure 3.

In the accompanying drawings there is a jig 10 which is made in accordance with the invention. The jig is constructed to facilitate the installation of replacement convertible tops on motor vehicles. It includes three legs 12, 13 and 14 which may be rested on feet or anchored in place. Where a collapsible jig is considered desirable or necessary, the legs may be detachably connected with the main frame 16 of the jig. Moreover, they may be made extensible so that the jig 10 is capable of being adjusted to suit the demands of a particular operator. Main frame 16 comprises a generally rectangular platform 18 which is bolted or otherwise secured to angle iron frame members 20 and 22 whose inner ends are bolted, welded or otherwise fastened to an intermediate portion of a generally U-shaped member 24 having sides 25 and 26. The sides are inclined downwardly and rearwardly (Figure 4) and have their ends joined by a rear cross member 28. Vertical legs 32 and 34 are secured to the angle iron platform supports 20 and 22 and to the rear cross member 28.

There are means carried by the main frame 16 of the jig for supporting the tacking strip 40 in a manner and which a curvature identical to the curvature required when the tacking strip is installed in the motor vehicle. Customarily at the present time the tacking strip 40 is attached in the motor vehicle by bolts. Accordingly, bolts 41 are passed through the bolt holes in the strip 40 and are threaded in tapped bores in the struts 44, the latter being secured firmly to and protruding from the generally U-shaped frame member 24.

There are means for supporting the replacement with a convertible top in proper position that is, the position that the replacement top is expected to assume when applied onto the motor vehicle. These means comprise a rear bow 48 having a bow block 50 shaped to simulate the rear bow of the convertible top mechanism. There is an intermediate bow 52 located in advance of the bow 48, intermediate bow 52 having a bow block 54 which is shaped and contoured to simulate the shape and contour of an intermediate bow in the convertible top mechanism. Rear bow 48 comprises a pair of support legs 56 and 58 whose lower ends are bolted to supporting brackets 60 and 61 carried by angle iron platform support members 20 and 22. Braces 64 and 66 are pivoted at their opposite ends to the legs 56 and 58 and to the support members 20 and 22. These braces are each provided with a turnbuckle or other equivalent extensible device in order to adjust the position of rear bow 48 and assure that the rear bow will maintain its position of adjustment. Intermediate bow 52 is constructed of a block 54 having legs 70 and 72 carried in mounting brackets 73 and 74 that are bolted, welded or otherwise secured to angle iron members 20 and 22. Accordingly, the intermediate bow 52 is adjustable.

A preformer 78 is carried by the main frame, being superposed with respect to the means that support the tacking strip 40. Preformer 78 consists of a curved bar 80 having a configuration which simulates the configuration of the convertible top near the rear end thereof, at or beneath the rear window thereof. A plurality of generally U-shaped brackets 83, 84, 85 and 86 being exemplary, have upper sides that are welded or otherwise secured to the bar 80 and have other sides which are welded or otherwise secured to the main frame 16 of th jig and explicitly to the generally U-shaped frame member 24 thereof. This provides between them and th tacking strip 40 a passage through which the end of th replacement convertible top may be passed.

In operation of the jig the convertible top which is to t a replacement for the motor vehicle is placed over tl bow blocks of bows 48 and 50 with the rear part of tl top at rest. Tacking strip 40 is removed from the mot vehicle and bolted or otherwise secured to the supporti vehicle means for the tacking strip. Then the rear end of t convertible top replacement is pulled between the p former 78 and the tacking strip 40 and centered the with. Then it is tacked in place, whereby the convertible top and its tacking strip 40 are separated as a unit for application to the convertible motor vehicle. In this way proper alignment of the tacking strip and top are assured whereby the back part of the top will be completely wrinkle free.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a jig which is to be used for aiding in the recovering of convertibles, a support for a tacking strip of the convertible, means to support the top in superposition to the tacking strip so that the tacking strip and top may be aligned and attached to each other, a preformer including a bar having the desired contour of the convertible top near the rear thereof, and means supporting said bar in juxtaposition to said tacking strip support.

2. In a jig which is to be used for aiding in the recovering of convertibles, a support for a tacking strip of the convertible, means to support the top in superposition to the tacking strip so that the tacking strip and top may be aligned and attached to each other, a preformer including a bar having the desired contour of the convertible top near the rear thereof, means supporting said bar in juxtaposition to said tacking strip support, said top supporting means including at least one bow, and means operatively connected to said bow to adjust the position thereof.

3. The combination of claim 2 wherein there is a second bow constituting a part of said top supporting means, said second bow being spaced from the first mentioned bow.

References Cited in the file of this patent

UNITED STATES PATENTS

| | | |
|---|---|---|
| 378,457 | Oakes | Feb. 28, 1888 |
| 788,608 | Shipman | May 2, 1905 |
| 1,162,870 | Niehauser | Dec. 7, 1915 |
| 1,614,383 | Nightingale | Jan. 11, 1927 |
| 1,877,653 | Fageol | Sept. 13, 1932 |
| 2,370,083 | Smith | Feb. 20, 1945 |